M. Spenli,
Turning Irregular Forms.

Nº 63,571. Patented Apr. 2, 1867.

United States Patent Office.

MATHIAS SPENLI, OF DETROIT, MICHIGAN.

Letters Patent No. 63,571, dated April 2, 1867.

---

IMPROVEMENT IN WOOD-TURNING LATHES.

---

The Schedule referred to in these Letters Patent and making part of the same.

---

TO ALL WHOM IT MAY CONCERN:

Be it known that I, MATHIAS SPENLI, of Detroit, in the county of Wayne, and State of Michigan, have invented a new and improved Lathe for Turning Lasts; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a lathe which is so constructed that the right and left last may be turned simultaneously, and, furthermore, a small last may be turned from a large pattern, or vice versa.

Figure 1:
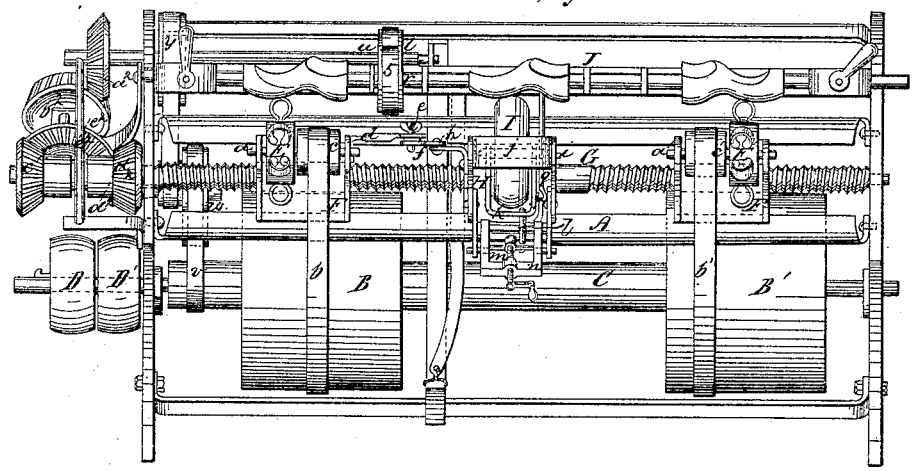
Figure 1 represents a plan or top view of this invention.
Figure 2:
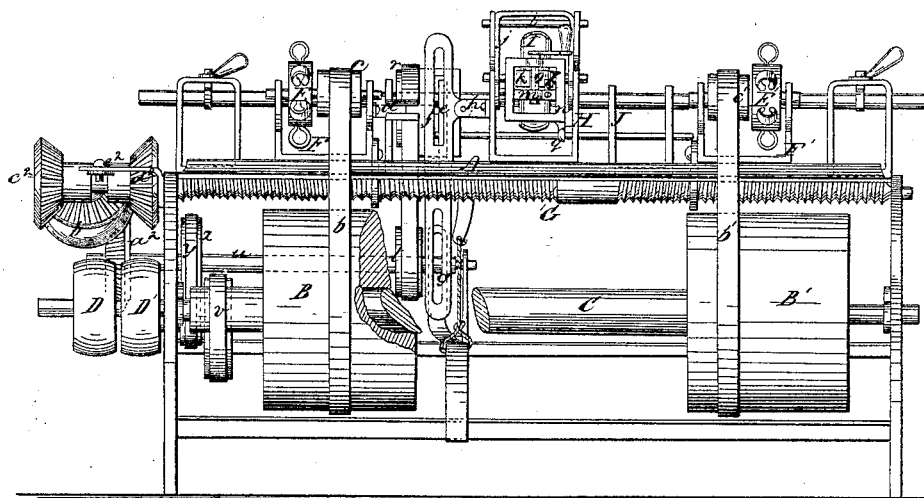
Figure 2 is a side elevation of the same.

A represents the frame or shears of my lathe, which I usually make of iron. This frame forms the bearings for the shaft C, on which are mounted two pulleys or drums, B B', and to which the required revolving motion is imparted by a belt running on the pulley D. D' is a loose pulley, on which the driving-belt is shifted when it is desired to stop the motion of said shaft. E E' are the cutters, which are mounted on arbors $a$ $a^1$, that have their bearings in heads or carriages F F', and to which a revolving motion is imparted by belts $b$ $b^1$, extending round the drums B B', and over pulleys $c$ $c^1$, which are mounted on the arbors $a$ $a^1$. The heads F F' traverse on the shears A, motion being imparted to them by a screw-spindle, G, which is provided with a right and left-handed thread, the right-handed thread to engage with a nut at the under side of the head F, and the left-handed thread with a similar nut at the under side of the head F'. Both screw-threads are of the same pitch, so that the heads move uniformly but in opposite directions. From the head F extends an arm, $d$, the end of which is slotted to receive a bolt, $e$, by which said arm can be connected to the vibrating slotted lever $f$, which has its fulcrum on a pivot, $g$, in the lower part of the lathe. This lever connects by a link, $h$, with a head, H, which carries the guide-wheel I. The head H moves in the shears A, and if the bolt $e$ is in line with the pin connecting the link $h$ and lever $f$, the motion of the head H is equal to that of the head F; but if the bolt $e$ is moved above or below said point of connection, the motion of the head H becomes smaller or larger than that of the head F. The object of this change in the motion of the head carrying the guide-wheel will be hereinafter explained. The head H, which carries the guide-wheel, forms the bearings for a pin, $i$, on which swings the stirrup $j$. This stirrup straddles the guide-wheel, and it forms the bearings for the axle of the guide-wheel, as shown in fig. 2. To this axle is attached a strap, $k$, which connects by a rod, $l$, with a cross-head, $m$, which is secured in a frame, $n$, to which a rising and falling motion can be imparted by a hand-screw, $o$. The frame $n$ is hung on pivots, $p$, secured in arms, which extend from the head H, and an arm extending from said frame connects by a rod, $q$, with the spindle-stock J. This spindle-stock is hung on pivots, which have their bearings in suitable arms extending from the shears A, and it is provided with three sets of centre-points, one set to receive the pattern-last, which stands opposite the guide-wheel, and the other set to receive the blanks, to be acted on by the cutters E E'. The pattern-last and the blanks form a connection between the various sets of centre-points, so that one pulley, $r$, is sufficient to impart to all of them a slow revolving motion. This motion is produced by a belt, $s$, extending from a pulley on the counter-shaft $u$, over the pulley $r$, and another belt, $v$, which extends from a small pulley on the driving-shaft over a pulley on the driving-shaft over a pulley on a stud, $w$, on which is mounted another pulley, which connects by a belt, $y$, with a pulley, $z$, on the counter-shaft. From the counter-shaft $u$ motion is imparted to the screw-spindle G, by a bevel-wheel, $a^2$, intermediate gear $b^2$, and the bevel-wheels $c^2$ $d^2$, which are mounted on a sleeve, which slides on the end of the screw-spindle in a longitudinal direction, but is connected to the same, so that both are compelled to revolve together. A clutch lever, $e^2$, serves to slide the sleeve so that either the wheel $c^2$ or the wheel $d^2$ can be made to engage with the intermediate gear $b^2$, and by these means the motion of said screw-spindle can be reversed at any moment. After the pattern-last and the blanks have been adjusted between their respective centre-points, the lathe is started and the spindle-stock J is pressed up by hand or otherwise towards the guide-wheel, until the pattern-last touches the circumference of the same. As the spindle-stock is moved towards the guide-wheel, the stirrup which forms the bearings for the axle of said guide-wheel is made to swing towards the pattern-last, and vice versa, and by these means the time required to bring the pattern-last in contact with the guide-wheel is shortened, and the operation of turning is facilitated. As the motion of the several parts of my lathe progresses, the cutters E E' take action on the blanks, and by the action of the screw-spindle G the heads F F' move towards or from each other, according to the position of the wheels $c^2 d^2$. The head H being connected to the head F, moves in the same direction with the same, and the last turned by the cutter E is identically the same as the pattern-last; but the head F' moves in a direction opposite to the head H, and the last turned by the cutter E' is the reverse of the pattern, that is to say, if the pattern is right, the last turned by the cutter E' is left, and *vice versa*. By these means a right-handed and a left-handed last are turned simultaneously. It has been previously stated that by shifting the bolt $e$ in the slotted lever $f$, the motion of the head H can be accelerated or retarded. If the motion of said head is slower than the motion of the cutter-heads, the lasts produced by the action of the cutters are larger than the pattern-last, and if the motion of the head H is quicker than that of the cutter-heads, the lasts produced by the action of the cutters are smaller than the pattern-last, and thus from one and the same pattern-last lasts of different size can be turned.

What I claim as new, and desire to secure by Letters Patent, is—

1. The arrangement of cutter-heads F F', moving in opposite directions, in combination with the head H, carrying the guide-wheel, substantially as and for the purpose described.

2. The vibrating slotted lever $f$ and bolt $e$, in combination with the heads H F, so that the speed of the head H in relation to the heads F F', can be regulated for the purpose specified.

3. Connecting the oscillating spindle-stock J with the stirrup supporting the axle of the guide-wheel so that said guide-wheel and spindle-stock move simultaneously towards and from each other, as and for the purpose set forth.

4. A lathe for turning lasts in which a right and left last are turned simultaneously from a single pattern, when constructed and operating substantially as described.

MATHIAS SPENLI.

Witnesses:
JULIUS STALL,
CARL SCHMEMANN.